United States Patent [19]

Wetherald

[11] 4,201,006
[45] May 6, 1980

[54] OSCILLATING FLASHER FOR DEEP WATER FISHING

[76] Inventor: Milo N. Wetherald, P.O. Box 1053, Port Angeles, Wash. 98362

[21] Appl. No.: 911,968

[22] Filed: Jun. 2, 1978

[51] Int. Cl.² ............................................. A01K 85/04
[52] U.S. Cl. .................................. 43/42.06; 43/42.39; 43/42.51
[58] Field of Search .................... 43/42.5, 42.51, 42.52, 43/42.39, 42.06

[56] References Cited

U.S. PATENT DOCUMENTS

| 1,115,743 | 11/1914 | Selig | 43/42.5 |
|---|---|---|---|
| 1,463,858 | 8/1923 | Wandue | 43/42.5 X |
| 2,463,889 | 3/1949 | Lundemo | 43/42.5 X |
| 2,608,787 | 9/1952 | Krogue | 43/42.51 |
| 3,056,228 | 10/1962 | Stackhouse | 43/42.51 |

FOREIGN PATENT DOCUMENTS

| 219551 | 10/1958 | Australia | 43/42.51 |
|---|---|---|---|
| 262197 | 9/1949 | Switzerland | 43/42.06 |

Primary Examiner—Nicholas P. Godici
Attorney, Agent, or Firm—Seed, Berry, Vernon & Baynham

[57] ABSTRACT

A flasher is disclosed particularly suited for deep water fishing, which imparts to the bait and hook attached to the downstream end of the flasher a jerking motion resembling a live bait as it is pulled through the water. The flasher has an elongated, non-floatable planar body having a flat center portion, an upwardly curved downstream portion and a downwardly curved upstream portion. An opening in the upstream portion of the body has a flap secured to the downstream side of the opening, the flap extending upwardly at an angle with respect to the body sufficient to cause the flasher to oscillate horizontally about its connection to a fishing line and relative to its direction of pull through the water. A weight may be secured to the upstream portion of the flasher. A shallow dimple also may be placed in the downstream portion of the body to enhance the oscillatory motion of the flasher.

9 Claims, 4 Drawing Figures

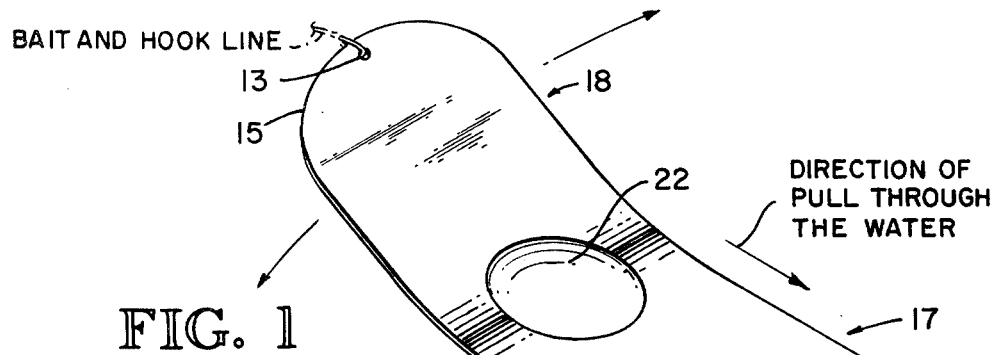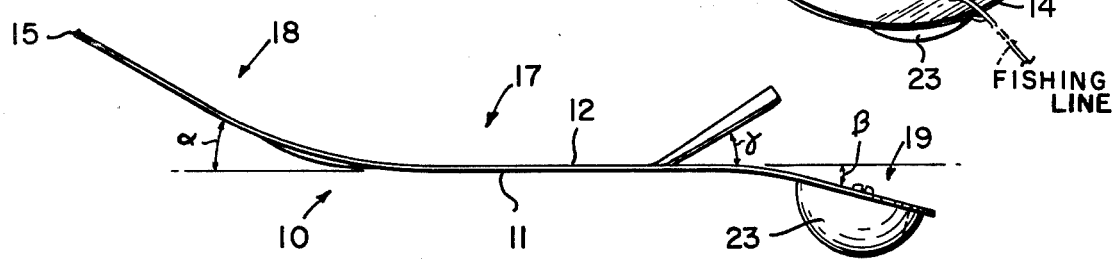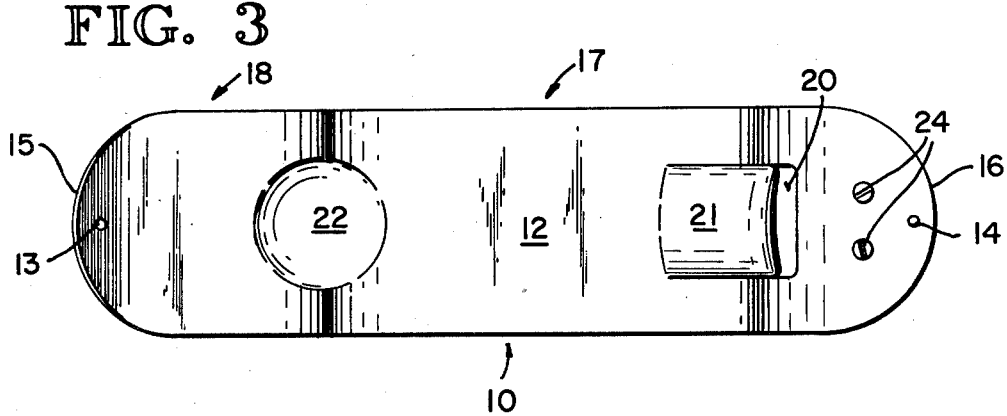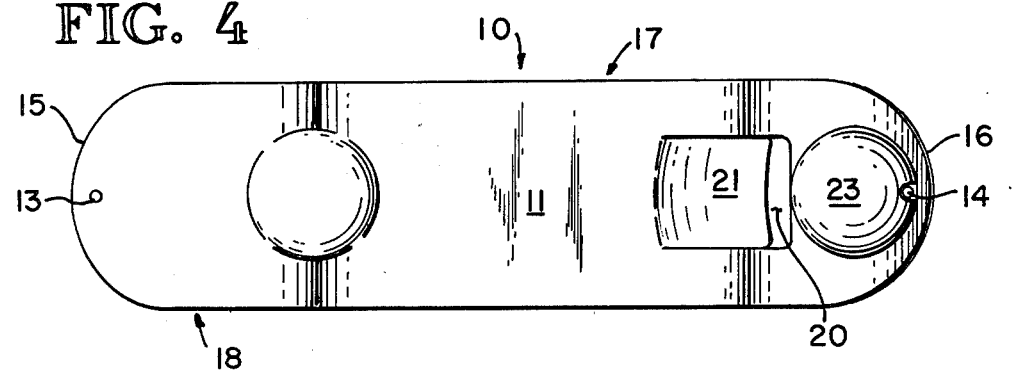

OSCILLATING FLASHER FOR DEEP WATER FISHING

BACKGROUND OF THE INVENTION

1. Field of the Invention

This invention relates to a flasher for attracting fish.

2. Description of the Prior Art

Flashers are conventionally used for salmon and other deep water fishing in waters off the West coast, in Puget Sound, lakes and elsewhere. One popular variety of flasher is a flat elongated piece of metal which has upturned edges on the upstream end of the flasher. As the flasher is pulled through the water, it tends to rotate about its point of connection to the fishing line to create a flashing effect to attract fish to the bait and hook secured to the downstream end of the flasher. Other varieties of flashers are also known; however, none of the flashers known to applicant oscillate in a way to make the trailing bait perform in a manner resembling the life-like swimming motion of a live bait.

SUMMARY OF THE INVENTION

The principal object of this invention is to provide a flasher for fishing which, when pulled through the water, oscillates horizontally about its point of connection to the fishing line, to impart a motion to the bait and hook trailing the flasher resembling the action of a live fish.

Another object of this invention is to provide a flasher having an elongated body with a flat center portion, an upwardly curved portion downstream of the center portion and a downwardly curved portion upstream of the center portion, the flasher including an opening in the upstream portion of the body having a flap which is integral with the downstream side of the opening, the flap extending upwardly at an angle with respect to the body sufficient to cause the flasher, when pulled through the water, to oscillate horizontally about its point of connection to the fishing line.

A further object of this invention is to provide a flasher of the type previously described having a shallow dimple formed toward the downstream end of the body of the flasher which acts to enhance the motion of the flasher.

BRIEF DESCRIPTION OF THE DRAWINGS

FIG. 1 is a perspective view of the flasher of this invention illustrating the manner in which it is attached to the fishing line and to the bait and hook and the direction of its pull through the water;

FIG. 2 is a side view of the flasher of FIG. 1;

FIG. 3 is a top view of the flasher of FIG. 1; and

FIG. 4 is a bottom view of the flasher of FIG. 1.

DETAILED DESCRIPTION OF THE PREFERRED EMBODIMENTS

The flasher of FIG. 1 has an elongated body 10 which may be of metal, plastic reinforced glass fiber or other suitable material. If the body is metal, it is preferably coated with a chromed or other bright surface so as to attract fish as it is pulled through the water. If made of plastic, it is preferably brightly colored and may have, if desired, a reflector imbedded within the plastic material. The ratio of length to width of the flasher body generally ranges from 3:1 to 5:1, preferably about 4:1. The flasher body illustrated in FIG. 1 is about 3 inches in width and has a length of 11 to 12 inches. The body is relatively thin, the thickness depending on the material from which the body is made. If metal is used, the thickness is generally only that required to give the flasher body sufficient structural strength to retain its shape under the conditions of its use and handling. If the flasher body is manufactured from plastic reinforced glass fiber material, it generally has a thickness greater than that of a metal material. The flasher body has a bottom surface 11 and an upper surface 12. A hole 14 at the edge of the downstream portion of the flasher body is provided for securing a fishing line to the flasher. A corresponding hole 13 is provided at the edge of the upstream end of the flasher body for securing the bait and hook thereto. The respective terminating ends 15 and 16 of the flasher body may be curved as illustrated. Referring to FIG. 2 the flasher body has a flat center portion 17, an upwardly curved downstream portion 18 relative to the center portion which is integral with the center portion and a downwardly curved upstream portion 19 also relative to and integral with the center portion. The degree of curvature of the downstream portion 16 with respect to the center portion should be sufficient to not cause the flasher body to flip over or rotate as it is pulled through the water. The angle alpha generally should be range from 15° to 25° and preferably about 20°. The angle beta of the upstream portion 19 relative to the center portion 12 is not particularly critical and generally ranges from 5° to 15°, preferably 10°. An opening 20 is cut in the upstream portion of the flasher body as illustrated. The size of the opening and its configuration are not particularly critical. The opening shown is square, each side having a length of about 1-¾ inches. A flap 21 substantially the same size as the opening 20, is secured to and integral with the downstream side of the flasher body. The flap 21 should extend upwardly relative to the body at an angle sufficient to cause the flasher, when pulled through the water, to oscillate horizontally (as shown by the arrows in FIG. 1) about its point of connection to the fishing line at 13. The angle gamma of the flap 21 relative to the body 12 is about 20°.

The elongated body may also have a shallow dimple 22 formed in the body thereof in the downstream portion thereof, as illustrated in FIGS. 1 and 2. The diameter of the dimple is not particularly critical. As illustrated the diameter is about one-half the width of the body of the flasher 10. The depth of the dimple may range from 1/16 of an inch to ¼ of an inch with respect to the top surface 12 of the body 10 of the flasher.

A weight 23 of lead or other suitable material may be secured to the flasher body near the upstream edge as illustrated in the drawings. The amount of weight used will depend on the depth at which it will be used. When fishing for salmon, for example, it is not unusual to fish at depths ranging from 50 to 100 feet or more. The weight 23 is secured to the flasher by any suitable means. As illustrated in the drawings, the weight is secured by two screws 24 which extend through the top surface 11 of the flasher body into the weight itself; however, it is preferable to use means to hold the weight onto the flasher body which allow the weight to be readily removed and replaced with a different size weight.

In use, the flasher is attached to fishing line at 14. A bait (which is generally dead herring when fishing for salmon) and hook are secured to the trailing end of the flasher at 13. When placed in the water the flasher descends to a depth dependent on the amount of fishing line and the amount of weight, if used. As the boat moves the fishing line pulls the flasher through the water in the direction indicated in FIG. 1. The water flows through the opening 20 and along the underside of the flasher as a stream of fast moving water. Additionally, the water striking the flap 21 is either forced to flow through the opening 20 or is deflected around the sides thereof. The combination of forces acting on the flasher, as it is pulled through the water, causes it to oscillate horizontally, back and forth, about its point of connection to the fishing line at 14. This oscillatory motion imparts a jerking motion to the bait and hook attached to the trailing edge of the flasher so that the action of the dead fish used as a bait resembles the swimming motion of live bait. Also the bright color of the flasher attracts the fish.

The flasher unit described is very effective in the catching of fish in deep water lakes and salt water. It is particularly adapted for catching salmon and sea trout commonly found along the Northwestern and Northeastern coasts.

I claim:

1. A flasher for attracting fish comprising:
   an elongated, non-floatable planar body whose length-to-width ratio ranges from 3:1 to 5:1 having an upper surface and lower surface, a flat center portion, a downstream portion curved upwardly across the entire width thereof relative to the center portion and an upstream portion curved downwardly across the entire width thereof relative to the center portion,
   means for securing a fishing line to the upstream end of the flasher and for securing bait and a fish hook to the downstream end of the flasher, and
   a substantially square opening in the upstream portion of the body having a width and length greater than half the width of the body and a flap substantially the size of the opening connected to the downstream side of the opening, the flap extending upwardly on the upper side of the body of the flasher at an angle with respect to the flat center portion of the body of about 20° to cause the flasher body, when pulled through the water, to oscillate horizontally about a vertical axis extending through its point of connection to the fishing line.

2. The flasher of claim 1 including a weight secured to the upstream portion of the flasher body upstream of the opening to cause the flasher to descend into the water a desired depth for fishing.

3. The flasher of claim 1 including a shallow dimple in the body in the downstream portion thereof.

4. The flasher of claim 3 wherein the dimple has a diameter of about one-half the width of the body.

5. The flasher of claim 1 wherein the downstream portion is curved upwardly relative to the center portion at an angle ranging from 15° to 25°.

6. The flasher of claim 1 wherein the upstream portion is curved downwardly relative to the center portion at an angle ranging from 5° to 15°.

7. A flasher for attracting fish in deep water fishing comprising:
   an elongated, non-floatable planar body whose length to width ratio ranges from 3:1 to 5:1 having an upper surface and a lower surface, a flat center portion, a downstream portion integral with the center portion curved upwardly at an angle ranging from 15° to 25° relative to the center portion and an upstream portion integral with the center portion curving downwardly relative to the center portion at an angle ranging from 5° to 15°,
   means for securing a fishing line to the upstream end of the flasher body and for securing a bait and fish hook to the downstream end of the flasher body, and
   a substantially square opening in the upstream portion of the body having a width and length greater than half the width of the body, the opening having a flap substantially the same size as the size of the opening connected to the downstream side of the opening, the flaps extending upwardly relative to the upper surface of the body at an angle with respect to the flat center portion of the body of about 20° to cause the flasher, when pulled through the water, to oscillate horizontally about its point connection to the fishing line.

8. The flasher of claim 7 including a weight secured to the lower surface of the body downstream from the opening therein to cause the flasher to descend into the water a depth desired for fishing.

9. The flasher of claim 7 including a shallow dimple in the flasher body having a diameter of about half the width of the body near the upstream end thereof.

* * * * *